(12) United States Patent
Kobayashi et al.

(10) Patent No.: US 10,724,664 B2
(45) Date of Patent: Jul. 28, 2020

(54) CONNECTOR

(71) Applicant: Surpass Industry Co., Ltd., Gyoda-shi, Saitama (JP)

(72) Inventors: Masamichi Kobayashi, Saitama (JP); Masahiro Hasunuma, Saitama (JP)

(73) Assignee: SURPASS INDUSTRY CO., LTD., Gyoda-Shi, Saitama (JP)

( * ) Notice: Subject to any disclaimer, the term of this patent is extended or adjusted under 35 U.S.C. 154(b) by 189 days.

(21) Appl. No.: 15/630,337

(22) Filed: Jun. 22, 2017

(65) Prior Publication Data

US 2017/0370509 A1 Dec. 28, 2017

(30) Foreign Application Priority Data

Jun. 23, 2016 (JP) .................................. 2016-124482

(51) Int. Cl.
| | | |
|---|---|---|
| *F16L 37/084* | (2006.01) | |
| *F16L 37/38* | (2006.01) | |
| *B67D 7/34* | (2010.01) | |
| *B67D 7/02* | (2010.01) | |

(52) U.S. Cl.
CPC .......... *F16L 37/084* (2013.01); *B67D 7/0294* (2013.01); *B67D 7/344* (2013.01); *F16L 37/38* (2013.01); *B67D 7/0283* (2013.01)

(58) Field of Classification Search
CPC ......... F16L 37/084; F16L 37/38; F16L 37/22; F16L 37/23
USPC .................................. 285/308, 317, 275–277
See application file for complete search history.

(56) References Cited

U.S. PATENT DOCUMENTS

| | | | |
|---|---|---|---|
| 5,971,019 A | 10/1999 | Imai | |
| 6,463,957 B1 * | 10/2002 | Ozawa | F16L 37/36 |
| | | | 137/614 |
| 2009/0188919 A1 | 7/2009 | Takanohashi | |
| 2009/0289449 A1 | 11/2009 | Hasunuma et al. | |
| 2011/0309114 A1 | 12/2011 | Chen | |

(Continued)

FOREIGN PATENT DOCUMENTS

| | | |
|---|---|---|
| EP | 0927849 A2 | 7/1999 |
| JP | H11-193894 A | 7/1999 |

(Continued)

OTHER PUBLICATIONS

Extended European Search Report dated Nov. 6, 2017 in corresponding European Application No. 17176814.6, 8 pages.

(Continued)

*Primary Examiner* — Anna M Momper
*Assistant Examiner* — Fannie C Kee
(74) *Attorney, Agent, or Firm* — MH2 Technology Law Group LLP

(57) ABSTRACT

Provided is a connector including: a plug to be attached to an opening of a liquid storing container and attached to an inner peripheral surface of the opening; a key ring to be attached to an outer peripheral surface of the opening extending along an axial line and including a key hole portion disposed at an outside of the outer peripheral surface with respect to the axial line; and a socket to be detachably attached to the plug and including a key rod portion to be engaged with the key hole portion. The plug and the socket are coupled together in a state where the key hole portion and the key rod portion are engaged with each other.

4 Claims, 13 Drawing Sheets

(56) References Cited

U.S. PATENT DOCUMENTS

2012/0037625 A1 2/2012 Hasunuma et al.
2015/0298960 A1 10/2015 Hennen

FOREIGN PATENT DOCUMENTS

| JP | 2009-173326 A | 8/2009 |
| JP | 2009281539 A | 12/2009 |
| JP | 2016500042 A | 1/2016 |
| WO | 03/045834 A1 | 6/2003 |
| WO | 2014/085701 A1 | 6/2014 |

OTHER PUBLICATIONS

Japanese Notice of Reasons for Refusal in Japanese Application No. 2016-124482 dated Nov. 20, 2019, 6 pages.

* cited by examiner

000
CONNECTOR

CROSS-REFERENCE TO RELATED APPLICATIONS

This application is based on Japanese Patent Application No. 2016-124482, the contents of which are incorporated herein by reference in its entirety.

TECHNICAL FIELD

The present disclosure relates to a connector to be attached to an opening of a liquid storing container.

BACKGROUND ART

Heretofore, a connector to be attached to a tank (liquid storing container) for storing a drug solution or the like used for semiconductor production has been known (e.g., see Japanese Unexamined Patent Application, Publication No. H11-193894 (hereinafter referred to as "JP H11-193894")).

The connector disclosed in JP H11-193894 includes a tank-side connector 1 in which a ring 7 that is provided with one or more keys 8 is buried, and a hose-side socket 2 having an outer peripheral surface in which a key groove 25 is formed at a position corresponding to the one or more keys 8. According to JP H11-193894, the key groove 25 of the hose-side socket 2 is formed at the position corresponding to one of more keys 8 of the tank-side connector 1, thereby preventing occurrence of a failure of an improper connection of the hose-side socket 2 that is incompatible with the one or more keys 8 of the tank-side connector 1.

SUMMARY

Technical Problem

In the connector disclosed in JP H11-193894, the ring 7 that is provided with the one or more keys 8 is buried in the tank-side connector 1 to be coupled to the hose-side socket 2. With this structure, when the key groove 25 of the hose-side socket 2 and the keys 8 of the tank-side connector 1 are disposed close to each other so that the key groove 25 is engaged with the keys 8, it is difficult for an operator to visually confirm the engaged state between the key groove 25 and the keys 8, and thus the operability is not always excellent.

The present disclosure has been made in view of the above-mentioned circumstances, and an object of the present disclosure is to provide a connector having improved operability of an operation for coupling a socket to a plug, while preventing occurrence of a failure of an improper connection of the socket that is incompatible with the plug when the socket is coupled to the plug to be attached to the inner peripheral surface of the liquid storing container.

Solution to Problem

To solve the above-mentioned problems, the present disclosure provides the following solutions.

A connector according to one aspect of the present disclosure is a connector to be attached to an opening of a liquid storing container, the connector including: an improper connection preventing member to be attached to an outer peripheral surface of the opening extending along an axial line, the improper connection preventing member including a first engagement portion disposed at an outside of the outer peripheral surface with respect to the axial line; and a socket to be detachably attached to a plug to be attached to an inner peripheral surface of the opening, the socket including a second engagement portion to be engaged with the first engagement portion. The plug and the socket are coupled together in a state where the first engagement portion and the second engagement portion are engaged with each other.

In the connector according to one aspect of the present disclosure, when the socket is coupled to the plug to be attached to the inner peripheral surface of the opening of the liquid storing container, the first engagement portion of the improper connection preventing member attached to the outer peripheral surface of the opening is engaged with the second engagement portion of the socket, thereby preventing occurrence of a failure of an improper connection of the socket that is incompatible with the plug.

Further, the first engagement portion included in the improper connection preventing member is disposed at an outside of the outer peripheral surface with respect to an axial line. This allows an operator to cause the first engagement portion and the second engagement portion to be engaged with each other, while visually observing the first and second engagement portions, even when the first engagement portion and the second engagement portion are disposed close to each other. This leads to an improvement in operability of an operation for coupling the socket to the plug.

Thus, the connector according to one aspect of the present disclosure has improved operability of an operation for coupling a socket to a plug, while preventing occurrence of a failure of an improper connection of the socket that is incompatible with the plug when the socket is coupled to the plug to be attached to an inner peripheral surface of a liquid storing container.

The connector according to one aspect of the present disclosure may have a structure in which: one of the first engagement portion and the second engagement portion is a convex portion formed into a convex shape projecting in a direction along the axial line; the other one of the first engagement portion and the second engagement portion is a concave portion formed into a concave shape in the direction along the axial line and capable of accommodating the convex portion; and the plug and the socket are coupled together in a state where the concave portion accommodates the convex portion.

This structure allows the operator to connect the socket to the plug by disposing the socket close to the plug so that the concave portion accommodates the convex portion, while visually observing the first engagement portion and the second engagement portion.

The connector having the structure as described above may have a form in which: the convex portion includes a columnar first convex member and a columnar second convex member; the concave portion includes a first concave hole for accommodating the first convex member and a second concave hole for accommodating the second convex member; and an outer diameter of the first convex member is larger than an outer diameter of the second convex member.

With this form, an improper connection between the plug and the socket can be more reliably prevented by combinations of the first and second convex members and the first and second concave holes respectively corresponding to the first and second convex members. Further, the operator can cause the first convex member having a large outer diameter to be accommodated in the first concave hole so that the second convex member having a small outer diameter can be accommodated in the second concave hole, thereby improving the operability.

In the connector having the form as described above, a leading end of the first convex member projects to a larger extent than a leading end of the second convex member.

With this structure, the second convex member having a small outer diameter can be engaged with the second concave hole after the first convex member having a large outer diameter is engaged with the first concave hole, thereby facilitating the engagement of the second convex member with the second concave hole, unlike in a case where the convex members and the concave holes are engaged with each other at the same time.

The connector according to one aspect the present disclosure may have a structure in which: the improper connection preventing member includes an engagement groove formed along a circumferential direction about the axial line; the socket includes a ball lock mechanism for fixing a plurality of lock balls to the engagement groove after allowing the plurality of lock balls to be engaged with the engagement groove; and the ball lock mechanism fixes the plurality of lock balls to the engagement groove after the first engagement portion is engaged with the second engagement portion.

With this structure, the socket can be fixed to the engagement groove of the improper connection preventing member by the ball lock mechanism after it is determined that the socket is compatible with the plug.

The connector having the structure as described above may have a form in which: the ball lock mechanism includes: the plurality of lock balls; a first cylindrical member formed into a cylindrical shape about the axial line and including a plurality of opening holes each having a diameter smaller than an outer diameter of the lock balls; a second cylindrical member formed into a cylindrical shape about the axial line and including a regulating portion disposed at an outer peripheral side of the first cylindrical member, the regulating portion being configured to regulate the lock balls accommodated in the opening holes to be in a state where the lock balls are engaged with the engagement groove; and an urging force generation portion having one end that is formed along the axial line and fixed to the first cylindrical member, and having another end that is formed along the axial line and fixed to the second cylindrical member, the urging force generation portion being configured to urge the second cylindrical member against a position where the regulating portion is in contact with the lock balls.

According to the connector having the form as described above, when the socket is attached to the opening of the liquid storing container including the plug fixed to the inner peripheral surface thereof, the operator presses the socket into the plug without touching the second cylindrical member, thereby allowing the lock balls to evacuate. This is because a force generated by pressing the socket by the operator becomes a force opposing the urging force of the urging force generation portion, which allows the second cylindrical member to move so that the lock balls can evacuate.

Further, the operator presses the socket into the plug until the lock balls reach the position of the engagement groove, thereby allowing the lock balls to be fixed to the engagement groove by the urging force of the urging force generation portion. Thus, the operator can cause the socket to be fixed to the engagement groove of the improper connection preventing member, without the need for any troublesome operation.

Advantageous Effects

According to the present disclosure, it is possible to provide a connector having improved operability of an operation for coupling a socket to a plug, while preventing occurrence of a failure of an improper connection of the socket that is incompatible with the plug when the socket is coupled to the plug to be attached to the inner peripheral surface of the opening of the liquid storing container.

DESCRIPTION OF EMBODIMENTS

A liquid supply system according to an embodiment of the present disclosure will be described below with reference to the drawings.

Figure 1:
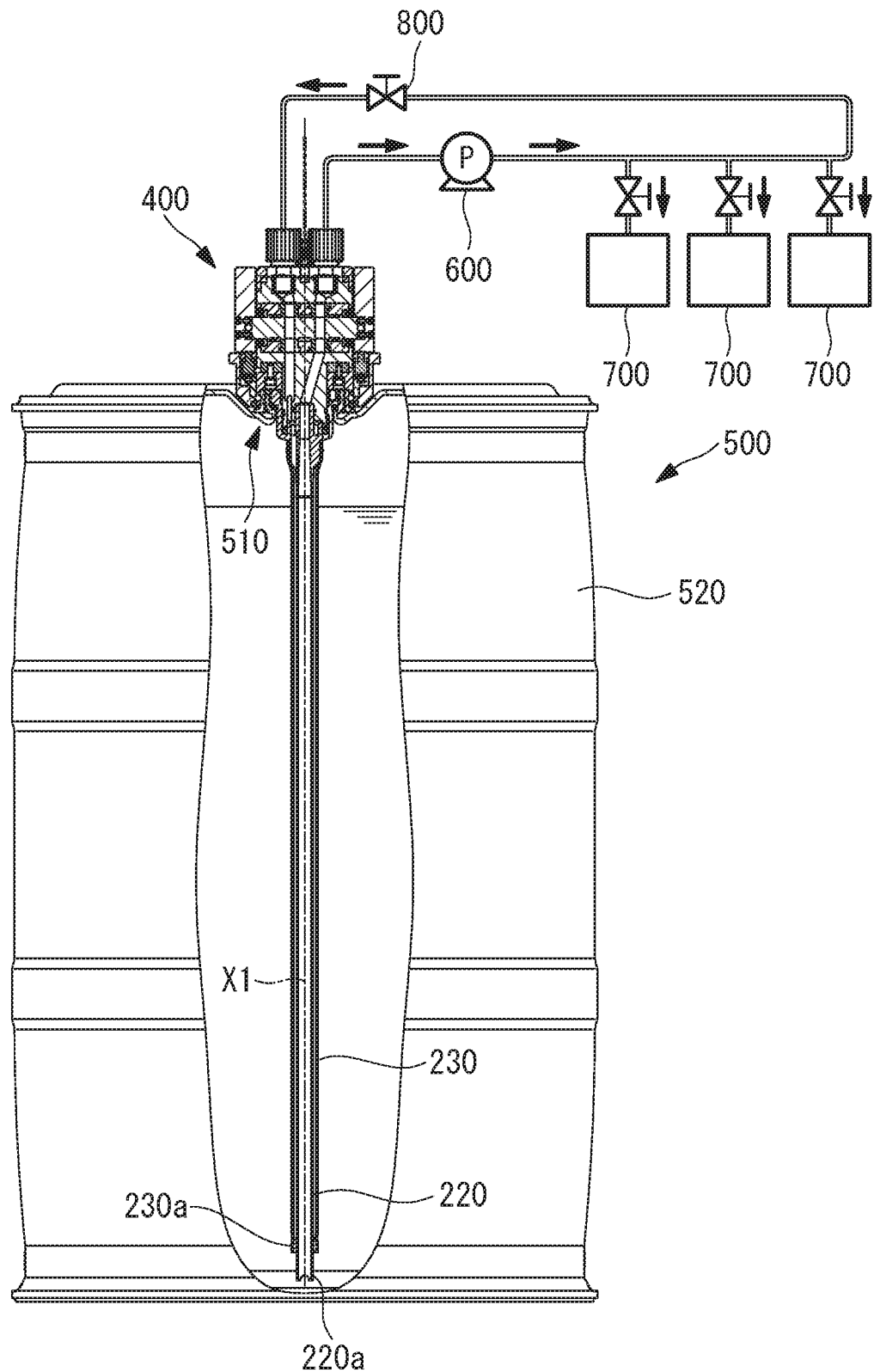
FIG. 1 is a block diagram showing a liquid supply system according to an embodiment of the present disclosure.

A liquid supply system according to this embodiment shown in FIG. 1 is a system in which a liquid contained in a liquid storing container 500 is sucked by a pump 600 and is supplied to a plurality of supply destination devices 700.

The amount of supply of the liquid to each supply destination device 700 is adjusted by a flow rate regulating valve provided on the supply destination device 700. The remaining liquid that is sucked by the pump 600 and is not supplied to each supply destination device 700 is returned to the liquid storing container 500 again via a circulating amount regulating valve 800.

In this manner, the liquid supply system according to this embodiment has a structure in which part of the liquid drawn out from the liquid storing container 500 is supplied to each supply destination device 700 and the remaining liquid is returned to each liquid storing container 500 again for circulation. This structure is intended to prevent solid particles from settling at the bottom of the liquid storing container 500, because the liquid contained in the liquid storing container 500 is a slurry in which solid particles are dispersed, and it is intended to prevent solid particles from settling at the bottom of the liquid storing container.

Note that the flow rate of the liquid to be circulated by the liquid supply system is adjusted by the aperture of the circulating amount regulating valve 800.

The slurry used as the liquid in this embodiment is, for example, a liquid containing a silica-based or seria-based polishing agent used for chemical mechanical polishing which is a wafer polishing method to be employed during semiconductor production.

As shown in FIG. 1, the liquid storing container 500 included in the liquid supply system according to this embodiment includes a container body 520 which contains a liquid, and an opening 510 which is provided in an upper surface (top board) of the container body 520 and is formed into a cylindrical shape about an axial line X1.

As shown in FIG. 1, the liquid supply system according to this embodiment includes a connector 400 to be attached to the opening 510 of the liquid storing container 500. The connector 400 is a device including a liquid outflow passage for causing the liquid contained in the liquid storing container 500 to be drawn out and fed to the pump 600; a liquid inflow passage for causing the liquid passing through the circulating amount regulating valve 800 to be returned to the liquid storing container 500; and a gas passage for introducing an outside air corresponding to the decreased amount of liquid from the liquid storing container 500. According to the connector 400 of this embodiment, outflow of the liquid, inflow of the liquid, and replacement of the outside air corresponding to the decreased amount of liquid can be achieved by one device attached to the opening 510 disposed at one section.

The connector 400 according to this embodiment will be described below with reference to the drawings.

Figure 2:
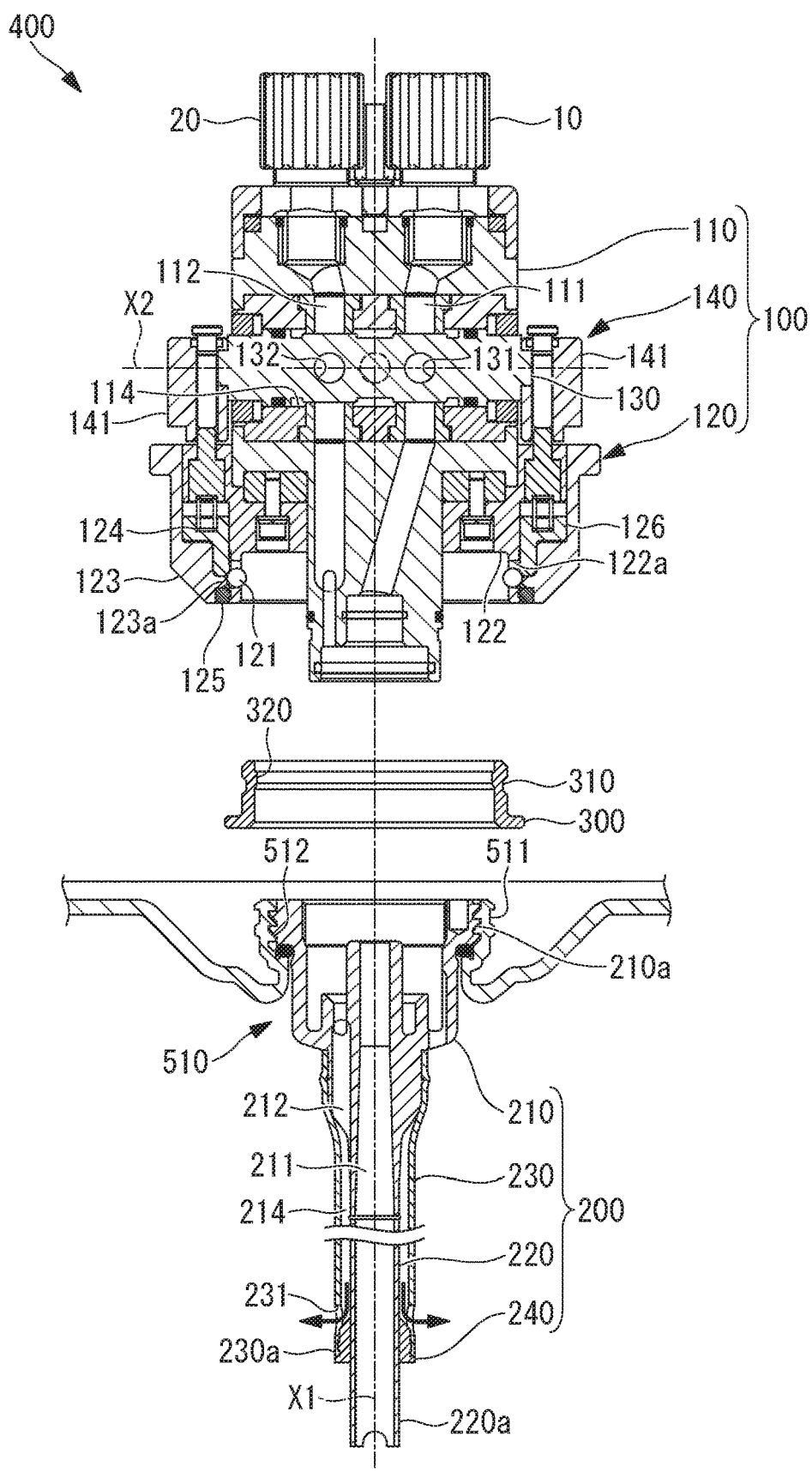
FIG. 2 is a partial longitudinal sectional view of a connector in a state where a socket is spaced apart from a plug and a key ring is spaced apart from an opening as viewed from the front side.
Figure 3:
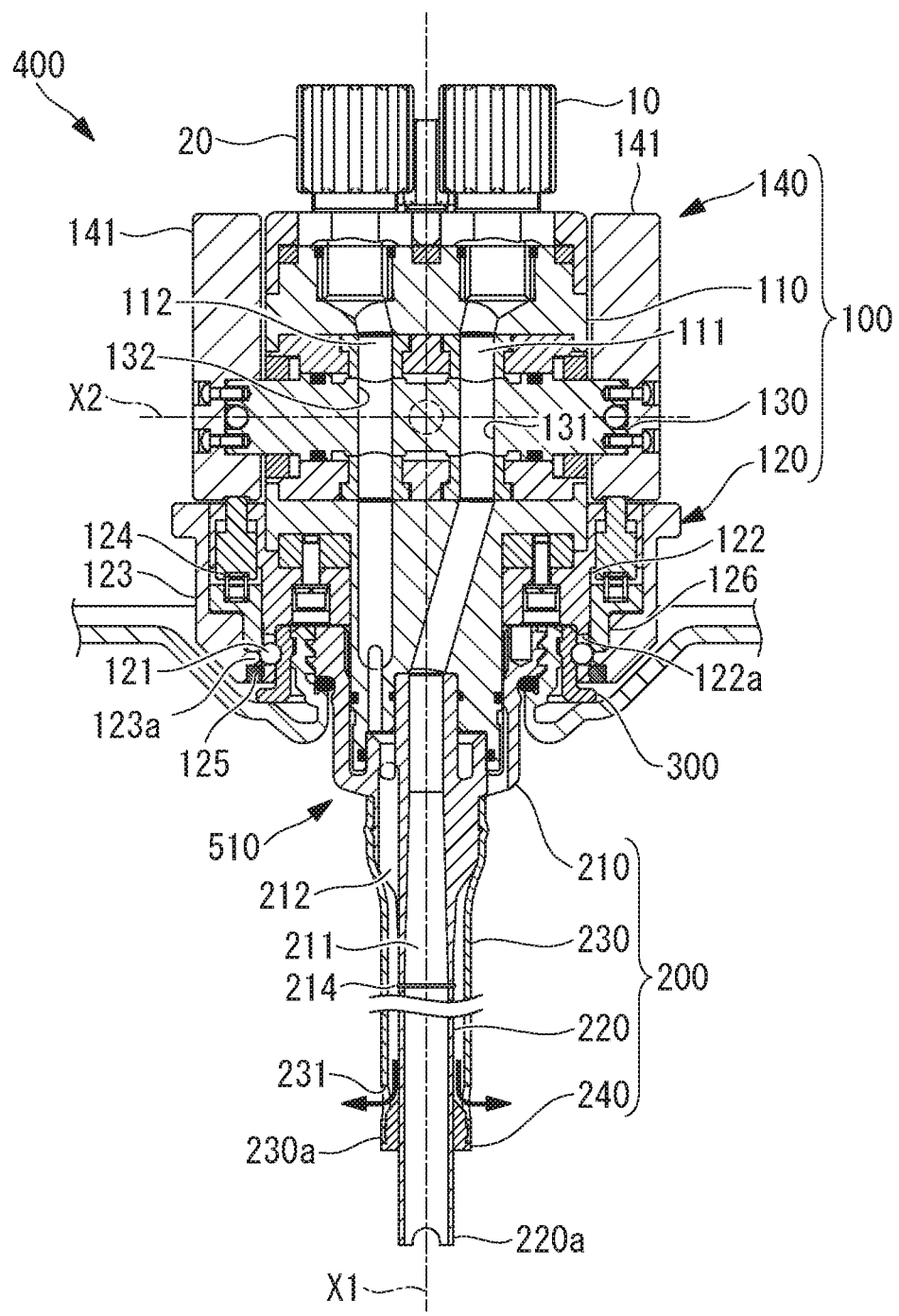
FIG. 3 is a partial longitudinal sectional view of the connector in a state where the socket is attached to the plug and the key ring is attached to the opening as viewed from the front side.

As shown in FIGS. 2 and 3, the connector 400 according to this embodiment includes a plug 200 to be fixed to a female screw 512 which is formed at the inner peripheral surface of the opening 510 formed in the upper surface of the liquid storing container 500; a key ring (improper connection preventing member) 300 to be attached to the outer peripheral surface of the opening 510; and a socket 100 to be detachably attached to the plug 200.

FIG. 2 is a longitudinal sectional view of the connector 400 in a state where the socket 100 is spaced apart from the plug 200 and the key ring 300 is spaced apart from the opening 510. FIG. 3 shows a state where the socket 100 is attached to the plug 200 and the key ring 300 is attached to the opening 510.

The plug 200 included in the connector 400 according to this embodiment will be described.

As shown in FIG. 2, the plug 200 includes a plug body 210; an inside pipe 220 which is attached to a lower position of the plug body 210 and is formed into a cylindrical shape about the axial line X1; an outside pipe 230 which is attached to the plug body 210 and has a cylindrical shape; and a sealing member 240 for sealing the space between the outside pipe 230 and the inside pipe 220.

Each member constituting the plug 200 is formed of a fluorine-contained resin material, such as PFA (tetrafluoro-ethylene-perfluoroalkyl vinyl ether copolymer), or a crystalline thermoplastic resin such as HDPE (high-density polyethylene).

The plug body 210 is a member which is formed into a substantially cylindrical shape about the axial line X1 and includes a male screw 210a that is formed at the outer peripheral surface of an upper end thereof. The male screw 210a of the plug body 210 is fastened to the female screw 512 formed at the inner peripheral surface of the opening 510, thereby allowing the plug body 210 to be fixed to the inner peripheral surface of the opening 510.

In the plug body 210, a first liquid outflow passage 211 and a first liquid inflow passage 212 are formed.

The first liquid outflow passage 211 is a passage for causing the liquid contained in the liquid storing container 500 to be drawn out and guided to an outflow port 10. The first liquid inflow passage 212 is a passage for guiding the liquid flowing in from the outside of the liquid storing container 500 via an inflow port 20 into the liquid storing container 500.

The inside pipe 220 is a member formed into a cylindrical shape along the axial line X1. As shown in FIG. 1, a lower end 220a of the inside pipe 220 is disposed near the bottom of the liquid storing container 500 in a state where the plug 200 is attached to the opening 510 of the liquid storing container 500.

The inside pipe 220 is attached to a lower end of the plug body 210 by thermal welding and guides the liquid contained in the liquid storing container 500 to the first liquid outflow passage 211 of the plug body 210.

The outside pipe 230 is a member formed into a cylindrical shape along the axial line X1. As shown in FIGS. 1 and 2, a lower end 230a of the outside pipe 230 is disposed at an upper position of the lower end 220a of the inside pipe 220 in a state where the plug 200 is attached to the opening 510 of the liquid storing container 500.

The outside pipe 230 is attached to the outer peripheral surface at a lower position of the plug body 210 by press fitting and is disposed outside of the inside pipe 220. Between the inner peripheral surface of the outside pipe 230 and the outer peripheral surface of the inside pipe 220, an annular passage 214 for guiding the liquid to be guided to the first liquid inflow passage 212 of the plug body 210 into the liquid storing container 500 is formed.

At the lower end 230a of the outside pipe 230, a plurality of outflow holes 231 through which the liquid is caused to flow out of the annular passage 214 into the liquid storing container 500 are formed at a plurality of sections (for example, four sections at an interval of 90°) about the axial line X1.

The sealing member 240 is a member for sealing the space between the inner peripheral surface of the lower end 230a of the outside pipe 230 and the outer peripheral surface of the inside pipe 220. The sealing member 240 prevents the liquid flowing in from the annular passage 214 from being directly guided to the bottom surface of the liquid storing container 500 along the axial line X1. Since the lower end of the annular passage 214 is sealed by the sealing member 240, the liquid which has reached the lower end of the annular passage 214 flows out into the liquid storing container 500 through the outflow holes 231 as indicated by arrows shown in FIG. 2.

The liquid falling from the upper position to the lower position along the annular passage 214 flows out horizontally (in a direction perpendicular to the axial line X1) from the plurality of outflow holes 231. Accordingly, the liquid flows out in a plurality of directions in which the plurality of outflow holes 231 are opened, so that the liquid in the vicinity of the bottom surface of the liquid storing container 500 flows favorably. Accordingly, when the liquid is a slurry containing a polishing agent or the like (a slurry in which solid particles are dispersed), the state in which the solid particles and the liquid are favorably mixed in the vicinity of the bottom surface of the liquid storing container 500 is maintained.

In the above description, the plurality of outflow holes 231 are formed at the lower end 230a of the outside pipe 230. Alternatively, a single outflow hole 231 may be formed at the lower end 230a of the outside pipe 230.

The socket 100 included in the connector 400 according to this embodiment will be described below.

As shown in FIG. 2, the socket 100 includes a socket body 110, a ball lock mechanism 120, which is attached to the socket body 110, a columnar rotary valve 130, which is inserted into a cylindrical insert hole 114 formed in the socket body 110, and a switching mechanism 140 that rotates the rotary valve 130 about an axial line X2.

As shown in FIG. 3, the socket 100 is fixed to the key ring 300, which is attached to the outer peripheral surface of the opening 510 of the liquid storing container 500, by the ball lock mechanism 120 in a state where a lower end of the socket body 110 is inserted into the plug body 210.

In the socket body 110, a second liquid outflow passage 111 and a second liquid inflow passage 112 are formed. The second liquid outflow passage 111 is a passage that causes the liquid to be drawn out from the first liquid outflow passage 211 via the discharge port 10 to flow to the outside. The second liquid inflow passage 112 is a passage that guides the liquid flowing in from the outside of the liquid storing container 500 via the inflow port 20 to the first liquid inflow passage 212.

The ball lock mechanism 120 is a mechanism that causes a plurality of lock balls 121 to be engaged with an engagement groove 310, which is formed along the circumferential direction about the axial line X1 of the key ring 300, and then fixes the plurality of lock balls 121 to the engagement groove 310. The state where the socket 100 and the plug 200 are coupled is maintained by fixing the socket body 110 to the key ring 300 by using the ball lock mechanism 120.

As shown in FIG. 2, the ball lock mechanism 120 includes a plurality of lock balls 121, a socket member (first cylindrical member) 122, a sleeve (second cylindrical member) 123, a spring (urging force generation portion) 124, a stop ring 125, and a spring receiving member 126.

The socket member 122 is a member including a plurality of opening holes 122a which are each formed into a cylindrical shape about the axial line X1 and have a diameter smaller than the outer diameter of each of the spherical lock balls 121. As shown in FIGS. 2 and 3, the plurality of lock balls 121 are respectively accommodated in the plurality of opening holes 122a of the socket member 122. However, the outer diameter of each of the lock balls 121 is larger than the diameter of each of the opening holes 122a, which prevents the lock balls 121 from being completely disengaged from the opening holes 122a into the inner peripheral side of the socket member 122.

The sleeve 123 is a member that is formed into a cylindrical shape about the axial line X1 and is disposed at the outer peripheral side of the socket member 122. The upper end position of the sleeve 123 is regulated by the socket member 122, and the lower end position thereof is regulated by the annular stop ring 125 which is attached to the outer peripheral surface at the lower end side of the socket member 122. The sleeve 123 is movable relatively to the socket member 122 between the upper end position and the lower end position along the axial line X1.

The sleeve 123 includes a regulating portion 123a that regulates the plurality of lock balls 121 respectively accommodated in the opening holes 122a to be in a state where the lock balls 121 are engaged with the engagement groove 310 of the key ring 300.

The spring 124 is an elastic member having an upper end (one end) that is formed along the axial line X1 and fixed to the socket member 122, and having a lower end (the other end) that is formed along the axial line X1 and fixed to the sleeve 123 via the spring receiving member 126. The spring 124 generates an urging force by elastic deformation, and urges the sleeve 123 against the lower end position where the regulating portion 123a of the sleeve 123 contacts the lock balls 121. The springs 124 are arranged at a plurality of sections at regular intervals (for example, six sections at an interval of 60°) in the circumferential direction about the axial line X1. The arrangement of the springs 124 at the plurality of sections at regular intervals makes it possible to supply the sleeve 123 with a uniform urging force.

In this case, the spring receiving member 126 is a member that is formed with an annular shape about the axial line X1, and has opening holes for accommodating the springs 124 that are formed at a plurality of sections.

While the springs 124 are provided at the plurality of sections at regular intervals in the circumferential direction about the axial line X1 in this embodiment, a single spring having the same diameter as that of the spring receiving member 126 may be provided about the axial line X1.

As shown in FIGS. 2 and 3, the rotary valve 130 is a member formed into a columnar shape along the axial line X2 which is perpendicular to the axial line X1. The rotary valve 130 includes an outflow through-hole 131 which is formed at a position where the second liquid outflow passage 111 on the axial line X2 is disposed, and an inflow through-hole 132 which is formed at a position where the second liquid inflow passage 112 on the axial line X2 is disposed. The rotary valve 130 is inserted into the insert hole 114, which is formed in the socket body 110, so as to be rotatable about the axial line X2.

The switching mechanism 140 is a mechanism that is coupled to the rotary valve 130 and causes the rotary valve 130 to be rotated about the axial line X2, thereby switching the rotary valve 130 to one of an open state and a closed state.

As shown in FIG. 3, the open state of the rotary valve 130 is a state in which the outflow through-hole 131 formed in the rotary valve 130 communicates with the second liquid outflow passage 111 of the socket body 110 and the inflow through-hole 132 formed in the rotary valve 130 communicates with the second liquid inflow passage 112 of the socket body 110.

As shown in FIG. 2, the closed state of the rotary valve 130 is a state in which the outflow through-hole 131 formed in the rotary valve 130 does not communicate with the second liquid outflow passage 111 of the socket body 110 and the inflow through-hole 132 formed in the rotary valve 130 does not communicate with the second liquid inflow passage 112 of the socket body 110.

The switching mechanism 140 includes a pair of opening/closing arms 141 that are coupled to both ends of the rotary valve 130 and accept an opening/closing operation by an operator.

The operator causes the plug 200 to be fixed to the inner peripheral surface of the opening 510 to attach the socket 100 to the key ring 300, and then grips the opening/closing arms 141 to be rotated about the axial line X2. As a result, the rotary valve 130 is switched from the closed state shown in FIG. 2 to the open state shown in FIG. 3.

Next, the key ring 300 included in the connector 400 according to this embodiment will be described. The key ring 300 is a member to be attached to the opening 510 of the liquid storing container 500. The key ring 300 is a member for preventing an improper connection in which the socket 100 which is incompatible with the plug 200 attached to the inner peripheral surface of the opening 510 is attached.

As shown in FIG. 2, the key ring 300 is a member which is made of a resin material and formed into a cylindrical shape extending along the axial line X1. The key ring 300 is a member including the endless engagement groove 310, which extends about the axial line X1 and is formed at the outer peripheral surface, and an endless engagement projection 320 which extends about the axial line X1 and is formed at the inner peripheral surface. The inner diameter of the engagement projection 320 is smaller than the outer diameter of the opening 510 of the liquid storing container 500. The inner diameter of the engagement projection 320 substantially matches the outer diameter of an engagement groove 511 which is formed in the opening 510.

The key ring 300, which is formed of a resin material, is pressed against the opening 510 by a jig (not shown), thereby elastically deforming the key ring 300. As a result, the engagement projection 320 formed in the inner peripheral surface of the key ring 300 is engaged with the engagement groove 511 formed in the outer peripheral surface of the opening 510, thereby allowing the key ring 300 to be fixed to the opening 510.

Figure 4:
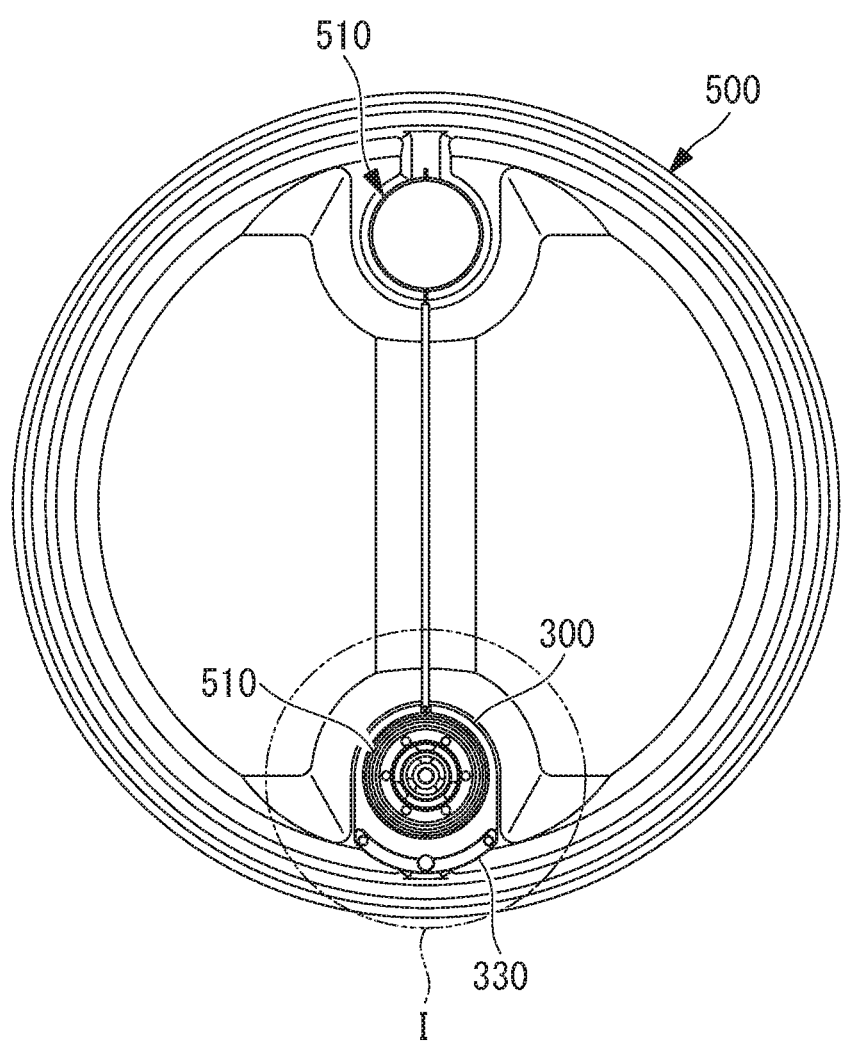
FIG. 4 is a plan view showing a liquid storing container in a state where the key ring is attached to the opening.
Figure 5:
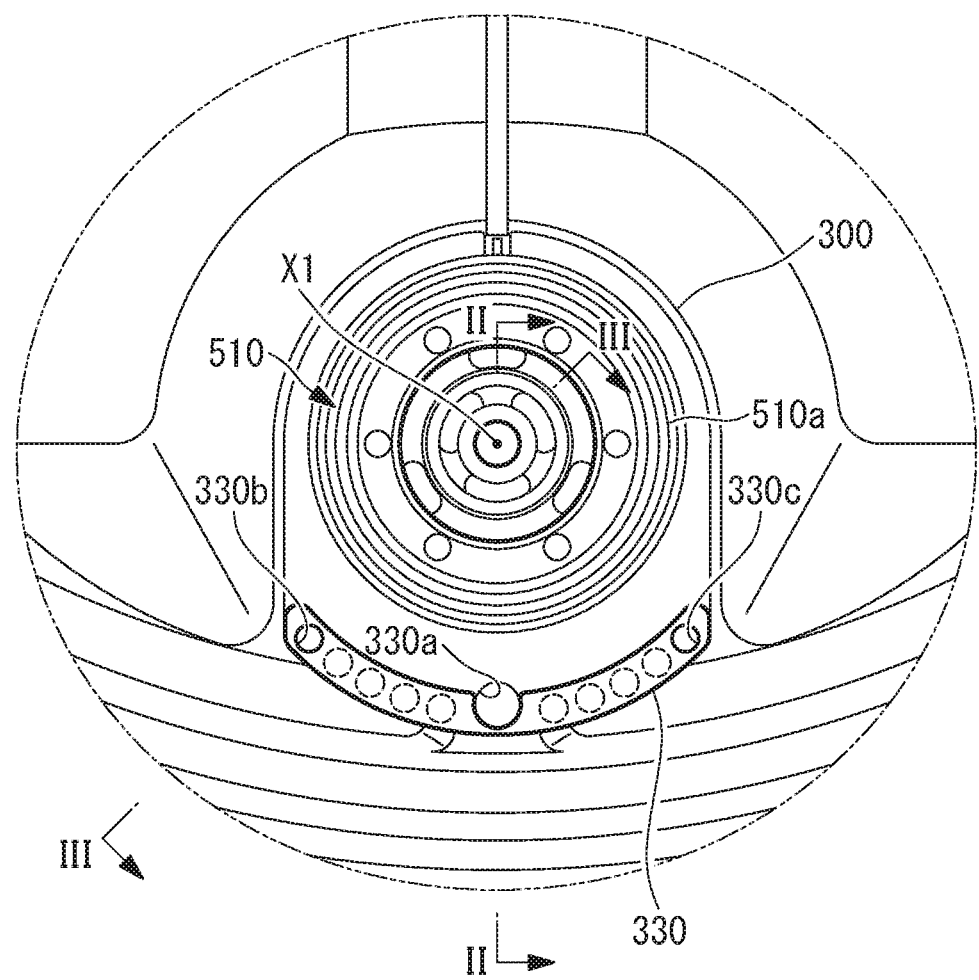
FIG. 5 is a partial enlarged view showing a portion "I" shown in FIG. 4.

As shown in FIGS. 4 and 5, the key ring 300 is attached to one of a pair of openings 510 formed in the upper surface of the liquid storing container 500. The key ring 300 includes a key hole portion (a first engagement portion; a concave portion) 330 that is disposed at an outside position of the liquid storing container 500.

The key hole portion 330 is a member which is disposed at an outside of an outer peripheral surface 510a of the opening 510 with respect to the axial line X1 and includes a main key hole (first concave hole) 330a, a sub-key hole (second concave hole) 330b, and a sub-key hole (second concave hole) 330c. The main key hole 330a, the sub-key hole 330b, and the sub-key hole 330c are holes which are formed into a concave shape and are recessed downward along the axial line X1.

The main key hole 330a is a hole that accommodates a main key rod 150a of a key rod portion 150 included in the socket 100. The sub-key hole 330b is a hole that accommodates a sub-key rod 150b of the key rod portion 150 included in the socket 100. The sub-key hole 330c is a hole that accommodates a sub-key rod 150c of the key rod portion 150 included in the socket 100.

Figure 6:
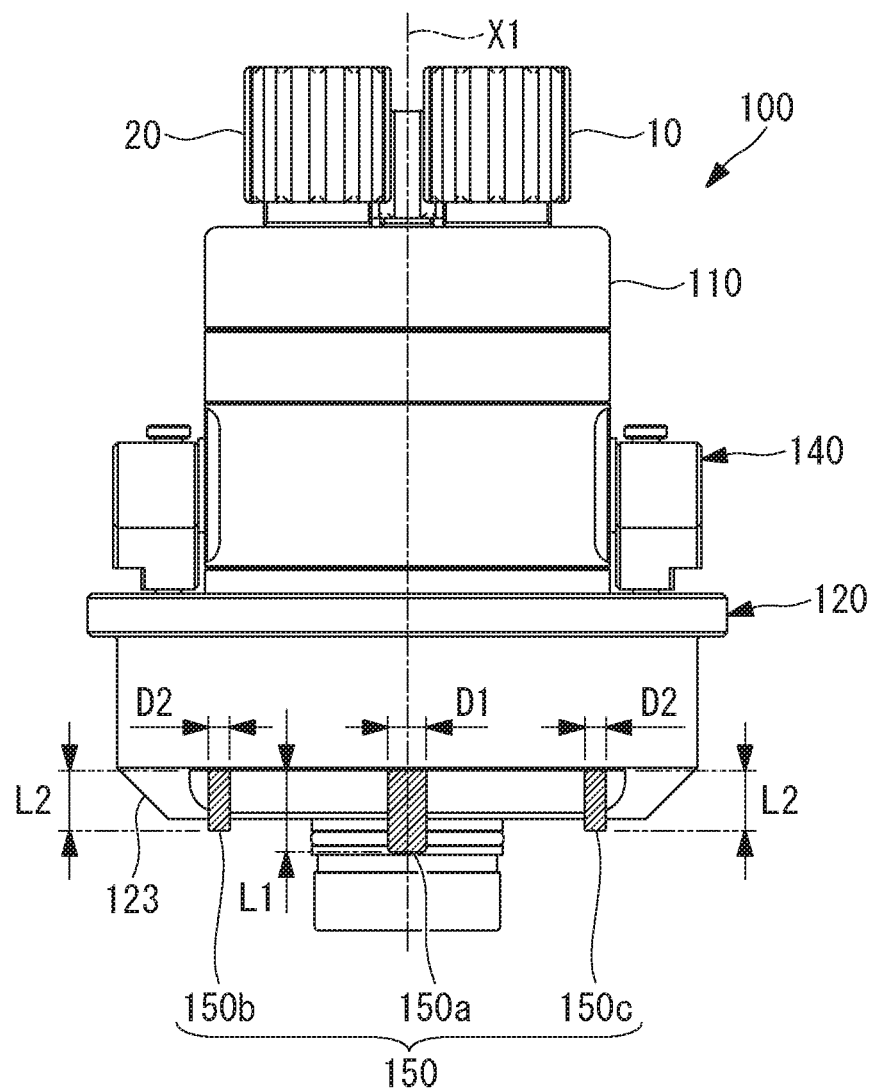
FIG. 6 is a front view of the socket shown in FIG. 3.
Figure 7:
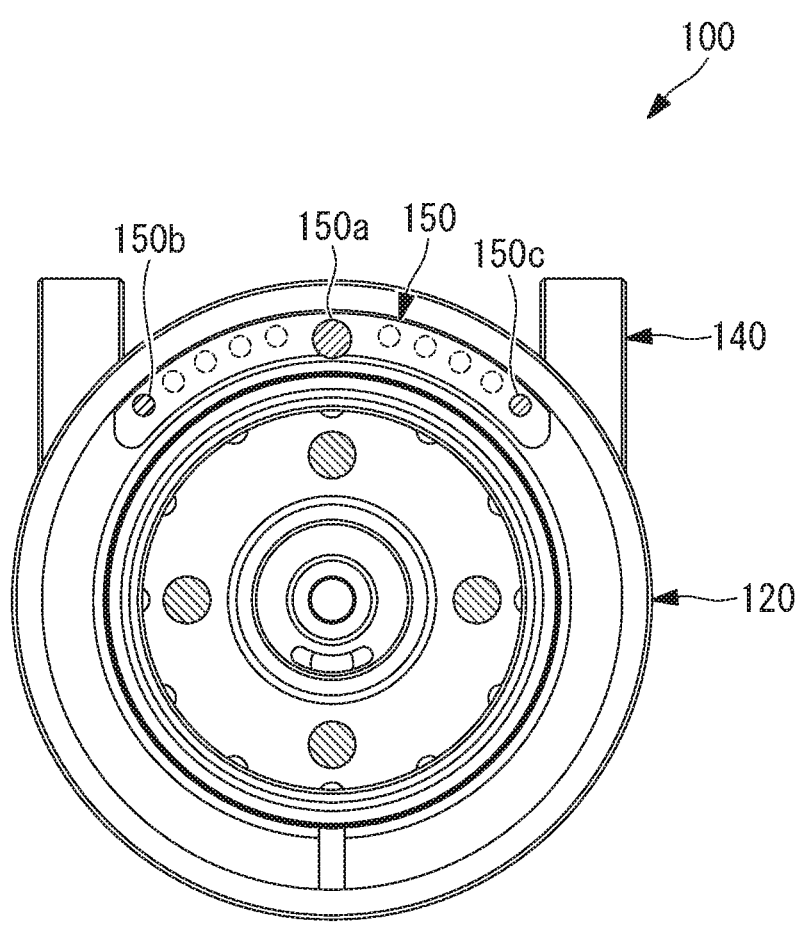
FIG. 7 is a bottom view of the socket shown in FIG. 6.

On the other hand, as shown in FIGS. 6 and 7, the socket 100 includes the key rod portion 150 which projects downward along the axial line X1 from the lower surface of the sleeve 123. The key rod portion 150 includes the main key rod (first convex member) 150a, the sub-key rod (second convex member) 150b, and the sub-key rod (second convex member) 150c. The main key rod 150a, the sub-key rod 150b, and the sub-key rod 150c are convex portions which are each formed into a columnar shape and project downward along the axial line X1.

As shown in FIG. 6, a length L1 of the main key rod 150a from the lower surface of the sleeve 123 is longer than a length L2 of each of the sub-key rod 150b and the sub-key rod 150c from the lower surface of the sleeve 123. Specifically, a leading end of the main key rod 150a projects downward along the axial line X1 to a larger extent than a leading end of each of the sub-key rod 150b and the sub-key rod 150c.

A diameter D1 in the radial direction perpendicular to the axial line X1 of the main key rod 150a is larger than a diameter D2 in the radial direction of each of the sub-key rod 150b and the sub-key rod 150c.

As shown in FIGS. 4 to 7, when the main key hole 330a of the key ring 300 and the main key rod 150a of the socket 100 are disposed at the same position about the axial line X1, the position of the sub-key hole 330b matches the position of the sub-key rod 150b and the position of the sub-key hole 330c matches the position of the sub-key rod 150c. Accordingly, the key rod portion 150 is a member that is engaged with the key hole portion 330.

As shown in FIG. 5, the key hole portion 330 is provided with the sub-key hole 330b and the sub-key hole 330c at target positions with respect to the main key hole 330a. However, the key hole portion may have another aspect.

For example, the sub-key hole 330b and the sub-key hole 330c may be formed at two arbitrary sections other than the position of the main key hole 330a. For example, the sub-key hole 330b and the sub-key hole 330c may be formed at two arbitrary sections by selecting the two section from ten sections including two sections each indicated by a solid line and eight sections each indicated by a dashed line in FIG. 5.

In this case, also in the key rod portion 150, the sub-key rod 150b and the sub-key rod 150c are formed at two arbitrary sections other than the position of the main key rod 150a. For example, the sub-key rod 150b and the sub-key rod 150c are formed at two arbitrary sections by selecting the two sections from ten sections including two section each indicated by a solid line and eight sections each indicated by a dashed line in FIG. 7.

Note that the position where the sub-key rod 150b is formed and the position where the sub-key rod 150c is formed correspond to the positions of the sub-key hole 330b and the sub-key hole 330c, respectively.

For example, the sub-key hole and the sub-key rod may be provided only at one section, or may be provided at three or more arbitrary sections. Also in this case, the position where the sub-key rod is formed corresponds to the position where the sub-key hole is formed.

Next, an operation for fixing the socket 100 to the key ring 300, which is attached to the opening 510 of the liquid storing container 500, by using the ball lock mechanism 120 will be described with reference to FIGS. 8 to 13.

Figure 8:
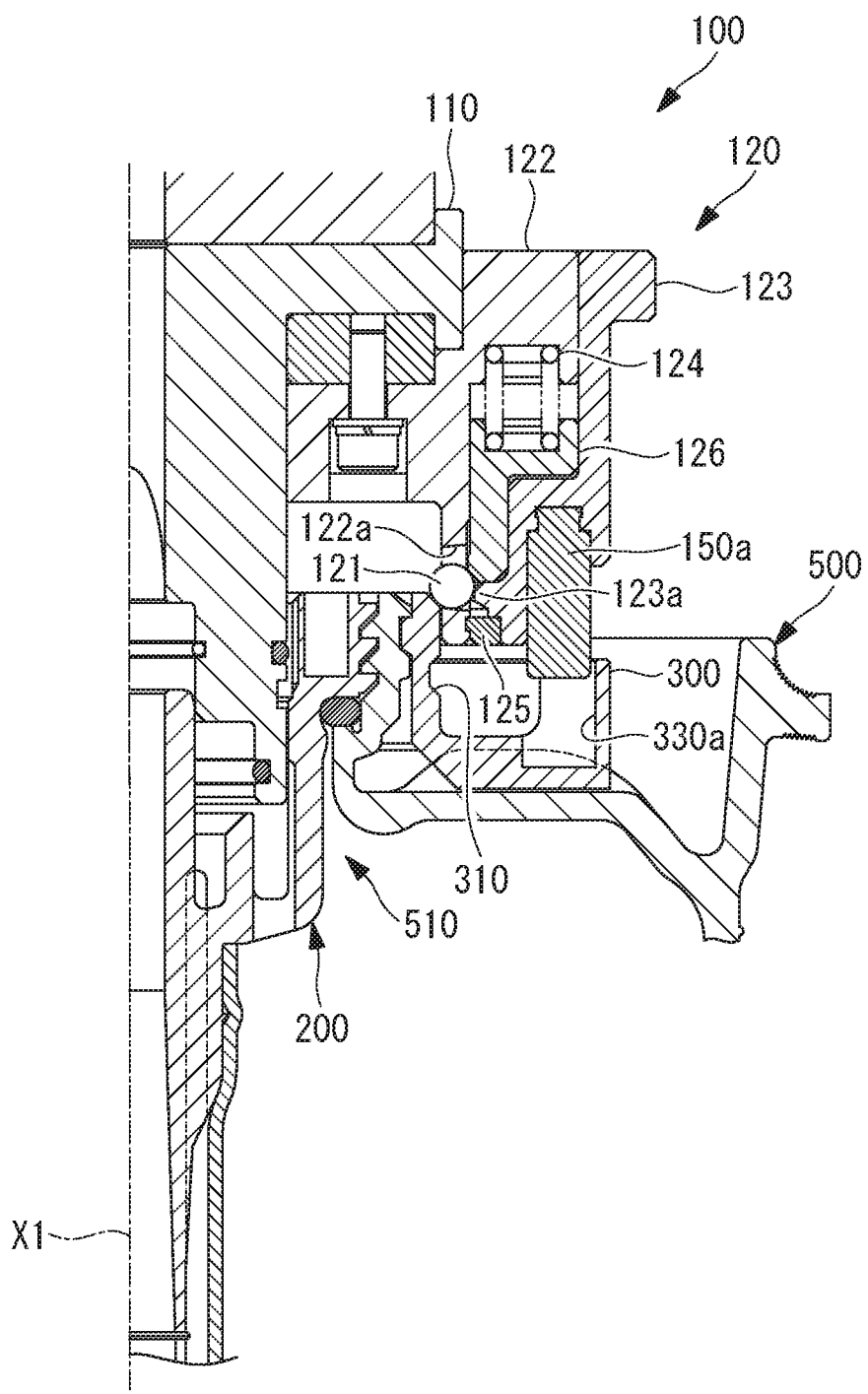
FIG. 8 is a partial longitudinal sectional view of the connector shown in FIG. 3.
Figure 9:
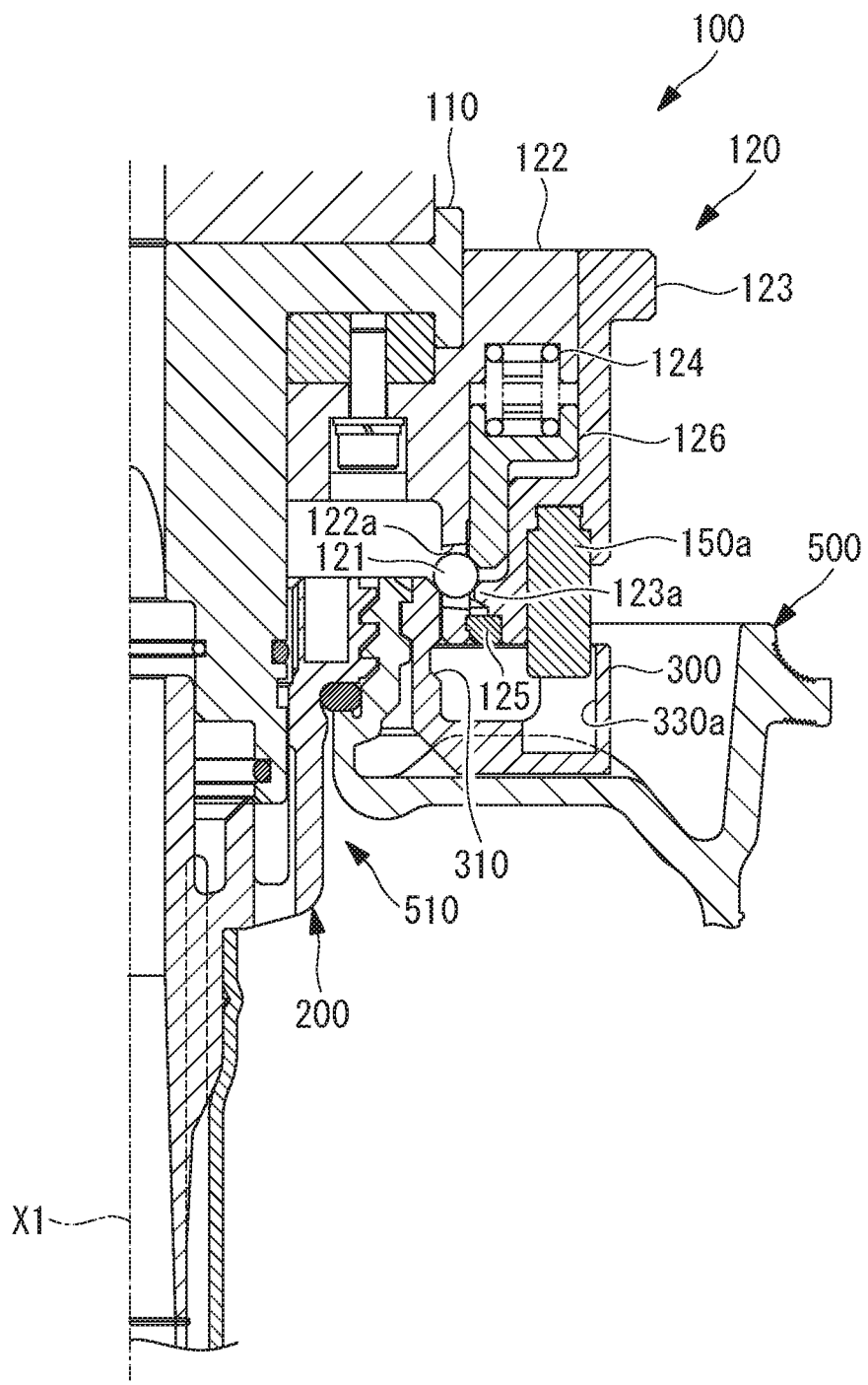
FIG. 9 is a partial longitudinal sectional view of the connector shown in FIG. 3.
Figure 10:
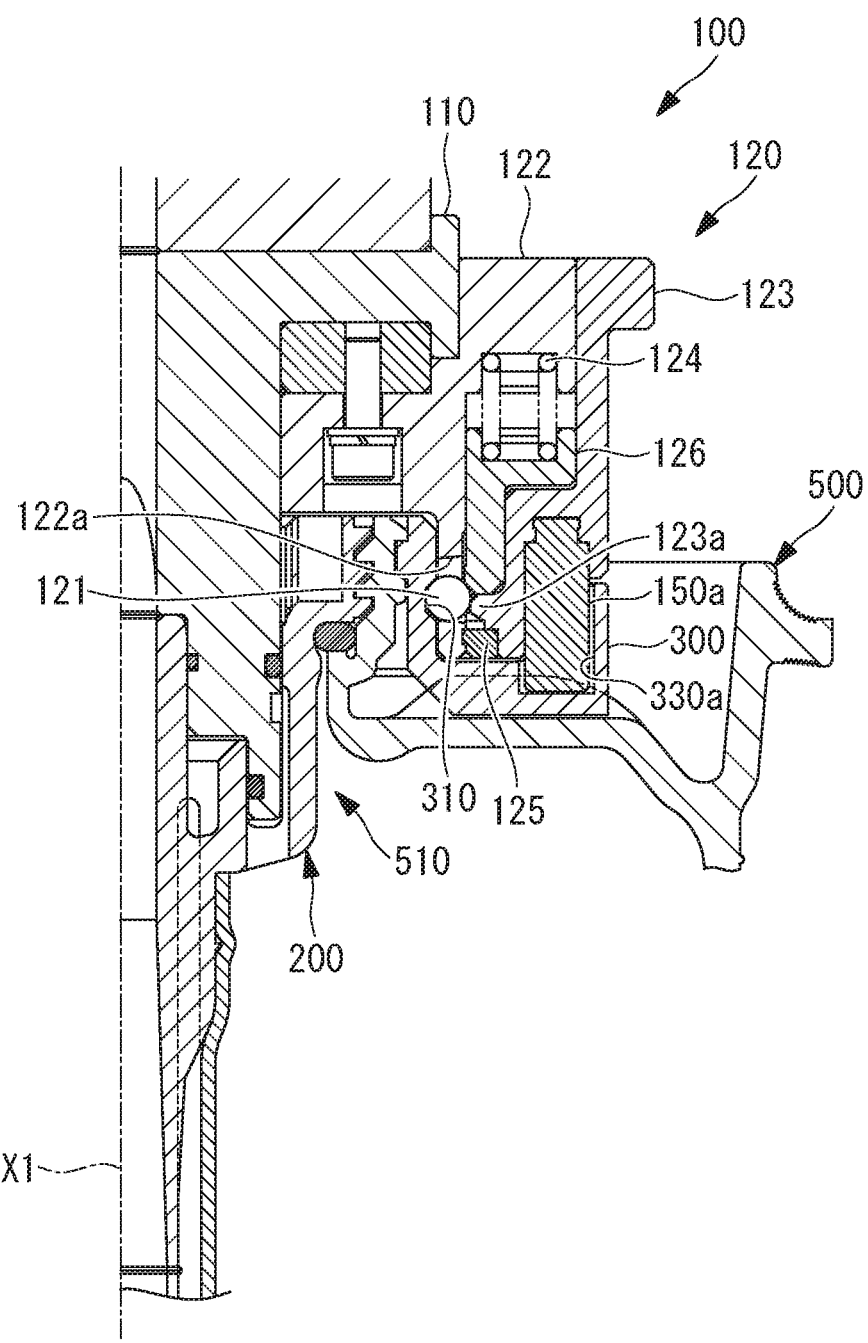
FIG. 10 is a partial longitudinal sectional view of the connector shown in FIG. 3.
Figure 11:
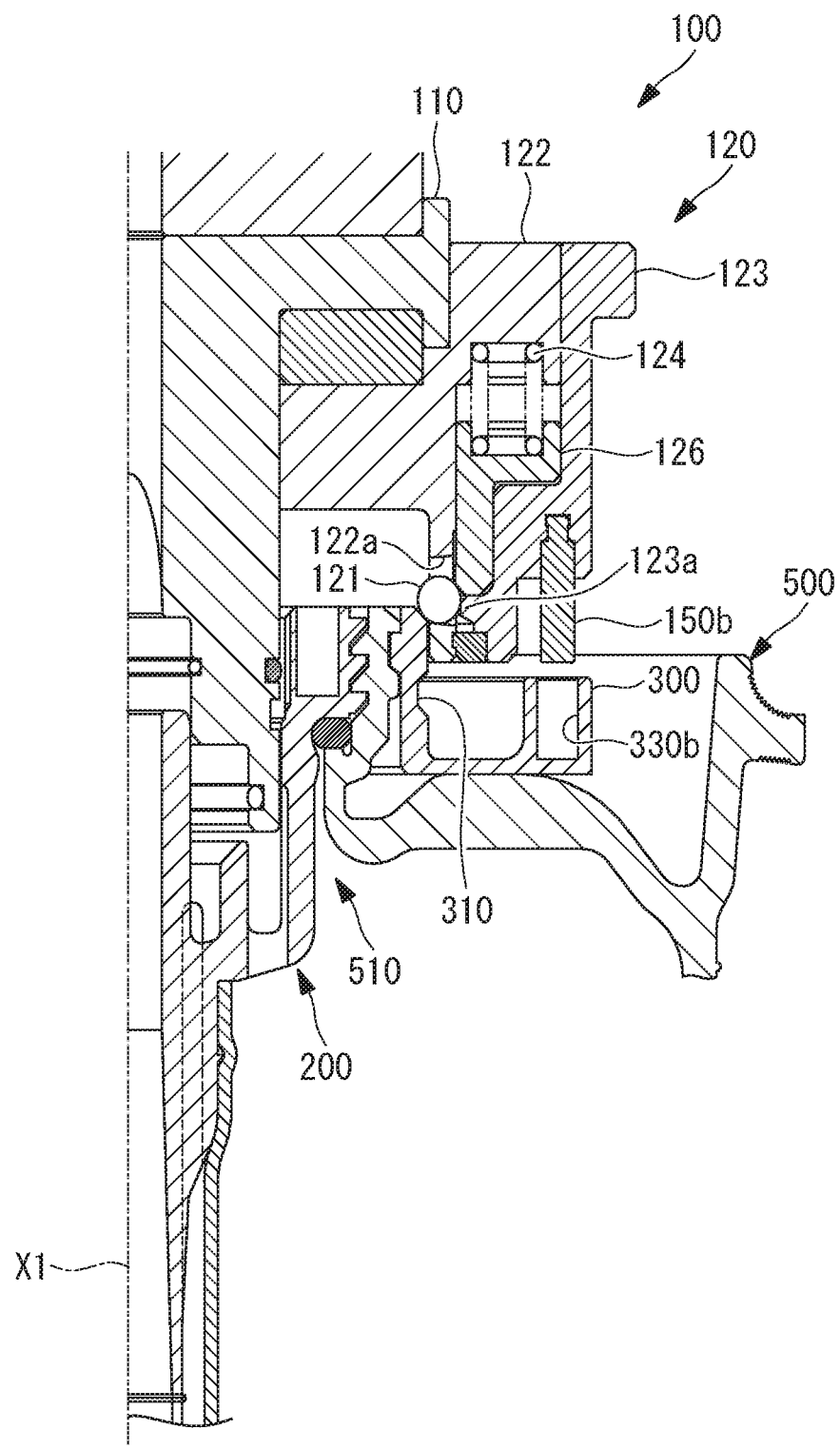
FIG. 11 is a partial longitudinal sectional view of the connector shown in FIG. 3.
Figure 12:
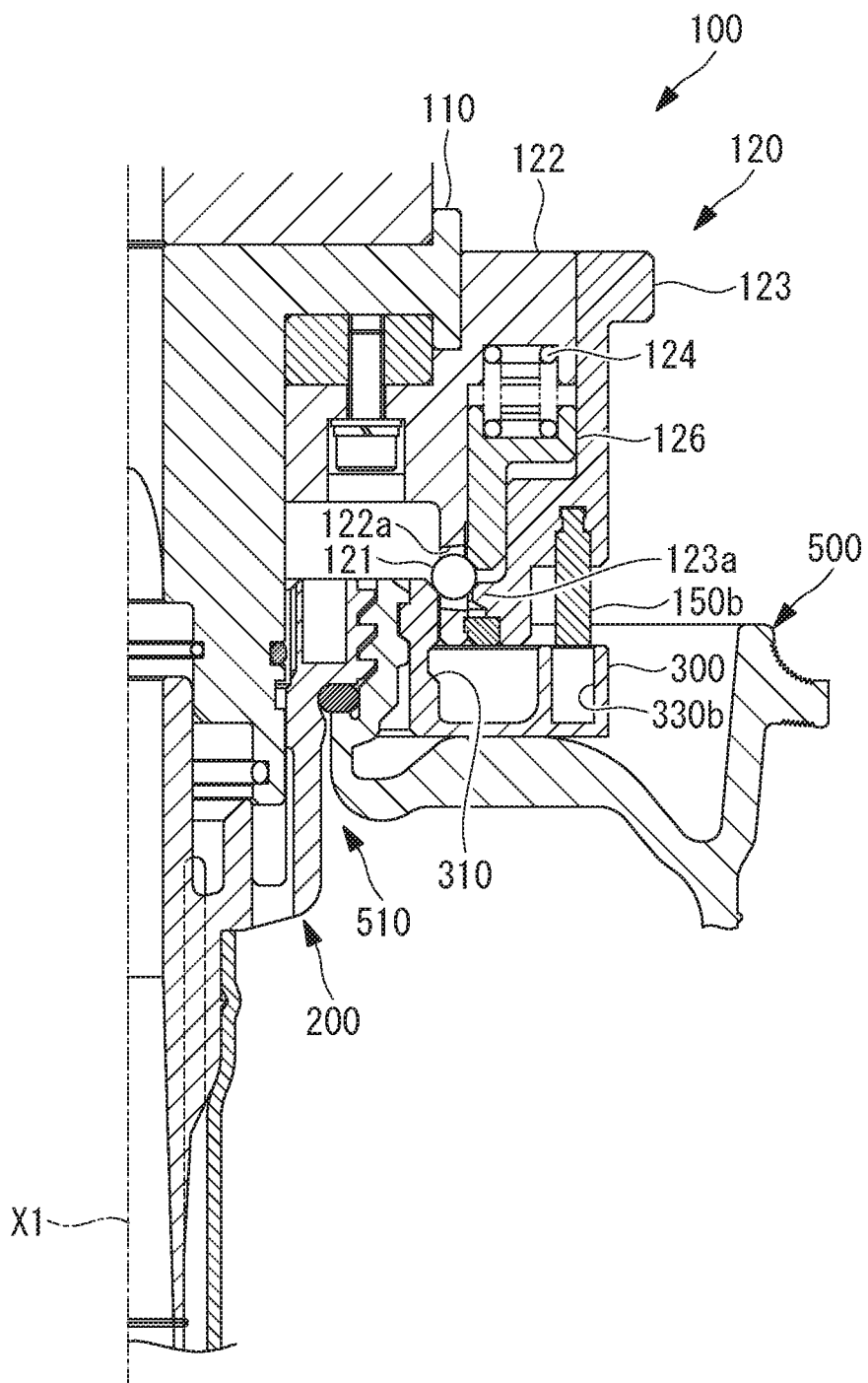
FIG. 12 is a partial longitudinal sectional view of the connector shown in FIG. 3.
Figure 13:
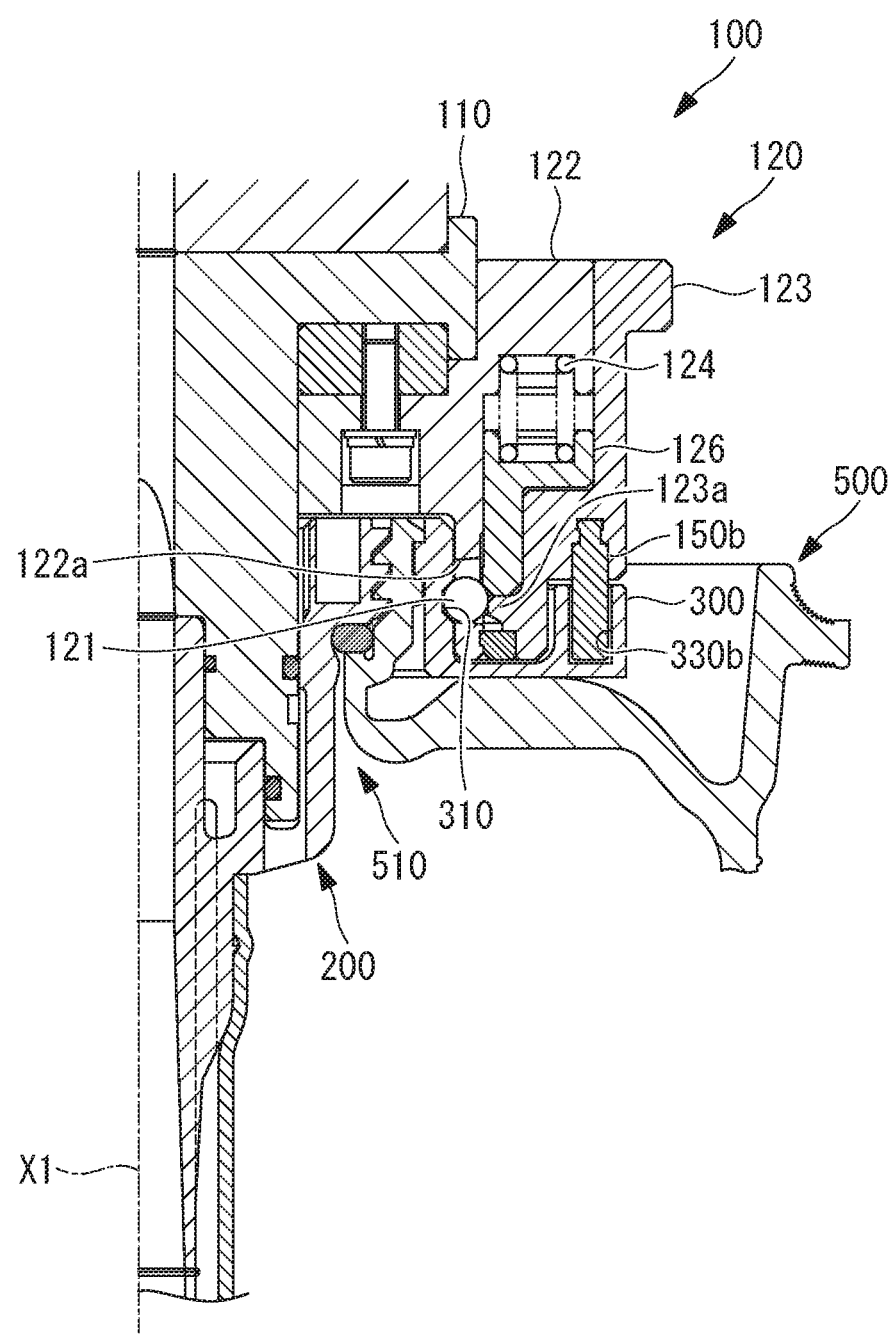
FIG. 13 is a partial longitudinal sectional view of the connector shown in FIG. 3.

FIGS. 8 to 10 are partial longitudinal sectional views of the connector 400 shown in FIG. 3, and are views of the connector 400 taken along a line II-II shown in FIG. 5. FIGS. 11 to 13 are partial longitudinal sectional views of the connector 400 shown in FIG. 3, and are views of the connector 400 taken along a line III-III shown in FIG. 5.

FIGS. 8 and 11, FIGS. 9 and 12, and FIGS. 10 and 13 show the state where the socket 100 is disposed at the same position on the axial line X1.

First, the operator stands near the opening 510 of the liquid storing container 500 and disposes the lower end of the socket 100 closer to the opening 510, while gripping the socket 100 in which the rotary valve 130 is in the closed state, thereby bringing the socket into states shown in FIGS. 8 and 11. In this case, the operator inserts the leading end of the main key rod 150a into the main key hole 330a, while visually observing both the main key hole 330a of the key hole portion 330 of the key ring 300 and the main key rod 150a of the key rod portion 150 of the socket 100.

As shown in FIG. 8, only the leading end of the main key rod 150a is inserted into the main key hole 330a. On the other hand, as shown in FIG. 11, the leading end of the sub-key rod 150b is not inserted into the sub-key hole 330b. At the point shown in FIGS. 8 and 11, the operator may perform only the operation for inserting the main key rod 150a into the main key hole 330a.

Next, the operator disposes the socket 100 closer to the key ring 300, while maintaining the state where the main key rod 150a is inserted into the main key hole 330a, thereby bringing the socket into states shown in FIGS. 9 and 12. In this case, the operator inserts the leading end of the sub-key rod 150b into the sub-key hole 330b, while visually observing both the sub-key hole 330b of the key hole portion 330 of the key ring 300 and the sub-key rod 150b of the key rod portion 150 of the socket 100. Similarly, the operator inserts the leading end of the sub-key rod 150c into the sub-key hole 330c, while visually observing both the sub-key hole 330c of the key hole portion 330 of the key ring 300 and the sub-key rod 150c of the key rod portion 150 of the socket 100.

In the operation in which the sub-key rod 150b is inserted into the sub-key hole 330b and the sub-key rod 150c is inserted into the sub-key hole 330c, the state where the main key rod 150a is inserted into the main key hole 330a is maintained. A phase about the axial line X1 of the socket with respect to a phase about the axial line X1 of the key ring 300 is held constant, which allows the operator to easily perform the operation for inserting the sub-key rod 150b and the sub-key rod 150c.

When the sub-key rod 150b is inserted into the sub-key hole 330b and the sub-key rod 150c is inserted into the sub-key hole 330c, the key rod portion 150 is accommodated in the key hole portion 330. As a result, the key rod portion 150 and the key hole portion 330 are engaged with each other.

At the point shown in FIGS. 9 and 12, the lock ball 121 of the ball lock mechanism 120 is in contact with the upper end of the key ring 300. The operator presses the socket 100 into the key ring 300, thereby allowing the lock ball 121 to evacuate to the outside. This is because a force generated by pressing the socket 100 by the operator becomes a force opposing the urging force of the spring 124, which allows the spring receiving member 126 to be moved upward so that the lock balls 121 can evacuate.

Further, the operator further presses the socket 100 into the key ring 300, thereby allowing the lock ball 121 to be engaged with the engagement groove 310 (states shown in FIGS. 10 and 13). This is because the lock balls 121 which have reached near the engagement groove 310 are moved toward the engagement groove 310 by the urging force of the spring 124.

In a state where the lock balls 121 are engaged with the engagement groove 310 and the movement of the lock balls 121 is regulated by the regulating portion 123a, the socket 100 is fixed to the key ring 300. Further, since the key ring 300 is fixed to the liquid storing container 500, the plug 200 and the socket 100 are coupled together. Thus, in the connector 400 according to this embodiment, the plug 200 and the socket 100 are coupled together in the state where the key rod portion 150 and the key hole portion 330 are engaged with each other.

The operation and effects provided by the connector 400 according to this embodiment described above will be described.

According to the connector 400 of this embodiment, when the socket 100 is coupled to the plug 200 to be attached to the inner peripheral surface of the opening 510 of the liquid storing container 500, the key hole portion 330 of the key ring 300, which is attached to the outer peripheral surface of the opening 510, is engaged with the key rod portion 150 of the socket 100, thereby preventing occurrence of a failure of an improper connection of the socket 100 that is incompatible with the plug 200.

Further, the key hole portion 330 of the key ring 300 is disposed at an outside of the outer peripheral surface of the opening 510 with respect to the axial line X1. Accordingly, the operator can cause the key hole portion 330 and the key rod portion 150 to be engaged with each other, while visually observing them, even when the key hole portion 330 and the key rod portion 150 are disposed closer to each other along the axial line X1. Consequently, the operability of the operation for coupling the socket 100 to the plug 200 is improved.

In this manner, according to the connector 400 of this embodiment, when the socket 100 is coupled to the plug 200 to be attached to the inner peripheral surface of the opening 510 of the liquid storing container 500, the operability of the operation for coupling the socket 100 to the plug 200 can be improved, while preventing occurrence of a failure of an improper connection of the socket 100 that is incompatible with the plug 200.

In the connector 400 according to this embodiment, the key rod portion 150 is a convex portion formed into a convex shape projecting in the direction along the axial line X1; the key hole portion 330 is a concave portion which is formed into a concave shape that is recessed in the direction along the axial line X1 and capable of accommodating the convex portion; and the plug 200 and the socket 100 are coupled together in the state where the concave portion accommodates the convex portion.

With this structure, the operator can couple the socket 100 to the plug 200 by disposing the socket 100 and the plug 200 closer to each other so that the concave portion accommodates the convex portion, while visually observing the key hole portion and the key rod portion.

In the connector 400 according to this embodiment, the key rod portion 150 includes the columnar main key rod 150a and the columnar sub-key rods 150b and 150c, and the key hole portion 330 includes the main key hole 330a that accommodates the main key rod 150a and the sub-key holes 330b and 330c that accommodate the sub-key rods 150b and 150c, respectively. In this case, the diameter D1 of the main key rod 150a is larger than the diameter D2 of each of the sub-key rods 150b and 150c.

With this structure, an improper connection between the plug 200 and the socket 100 can be more reliably prevented by combinations of the main key rod 150a and the sub-key rods 150b and 150c and the main key hole 330a and the sub-key holes 330b and 330c corresponding to the main key rod 150a and the sub-key rods 150b and 150c, respectively. Further, the operator causes the main key rod 150a having a large outer diameter to be accommodated in the main key hole 330a, thereby allowing the sub-key rods 150b and 150c each having a small outer diameter to be accommodated in the sub-key holes 330b and 330c, which leads to an improvement in operability.

The leading end of the main key rod 150a projects to a larger extent than the leading end of each of the sub-key rods 150b and 150c. With this structure, the sub-key rods 150b and 150c each having a small outer diameter can be engaged with the sub-key holes 330b and 330c, respectively, after the main key rod 150a having a large outer diameter is engaged with the main key hole 330a, thereby facilitating the engagement of the sub-key rods 150b and 150c with the sub-key holes 330b and 330c, respectively, unlike in a case where the sub-key rods and the sub-key holes are engaged with each other at the same time.

In the connector 400 according to this embodiment, the ball lock mechanism 120 fixes the plurality of lock balls 121 to the engagement groove 310 of the key ring 300 after the key hole portion 330 accommodates the key rod portion 150.

With this structure, the socket 100 can be fixed to the engagement groove 310 of the key ring 300 by the ball lock mechanism 120 after it is determined that the socket 100 is compatible with the plug 200.

According to the connector 400 of this embodiment, when the socket 100 is attached to the opening 510 of the liquid storing container 500 having the inner peripheral surface to which the plug 200 is fixed, the operator presses the socket 100 into the plug 200 without touching the sleeve 123, thereby allowing the lock balls 121 to evacuate. This is because a force generated by pressing the socket 100 by the operator becomes a force opposing the urging force of the spring 124, which allows the sleeve 123 to move so that the lock balls 121 can evacuate.

Further, the operator presses the socket 100 into the plug 200 until the lock balls 121 reach the position of the engagement groove 310, thereby allowing the lock balls 121 to be fixed to the engagement groove 310 by the urging force of the spring 124. Thus, the operator can cause the socket 100 to be fixed to the engagement groove 310 of the key ring 300, without the need for any troublesome operation.

Other Embodiments

In the above description, the key ring 300 includes the key hole portion 330 and the socket 100 includes the key rod portion 150, but instead may have another aspect. For example, the key ring 300 may include the key rod portion 150 and the socket 100 may include the key hole portion 330.

In other words, one of the key ring 300 and the socket 100 may include the key rod portion 150, and the other one of the key ring 300 and the socket 100 may include the key hole portion 330 that accommodates the key rod portion 150.

The invention claimed is:

1. A connector to be attached to an opening of a liquid storing container, the connector comprising:
a plug configured to be attached to an inner peripheral surface of the opening, the opening being formed into a cylindrical shape about an axial line;
an improper connection preventing member configured to be attached to an outer peripheral surface of the opening, the improper connection preventing member including a first engagement portion disposed at an outside of the outer peripheral surface with respect to the axial line; and
a socket to be detachably attached to the plug, the socket including a second engagement portion to be engaged with the first engagement portion, wherein the socket includes:
a socket body to be inserted into the plug in a state where the first engagement portion and the second engagement portion are engaged with each other, and
a lock mechanism configured to fix the socket body to the improper connection preventing member in a state where the first engagement portion and the second engagement portion are engaged with each other;
and wherein:
one of the first engagement portion and the second engagement portion is a convex portion having a convex shape projecting in a direction along the axial line;
the other one of the first engagement portion and the second engagement portion is a concave portion having a concave shape in the direction along the axial line and is configured to accommodate the convex portion;
the plug and the socket are coupled together in a state where the concave portion accommodates the convex portion;
the convex portion includes a columnar first convex member and a columnar second convex member;
the concave portion includes a first concave hole for accommodating the first convex member and a second concave hole for accommodating the second convex member; and
a leading end of the first convex member projects to a larger extent than a leading end of the second convex member.

2. The connector according to claim 1, wherein an outer diameter of the first convex member is larger than an outer diameter of the second convex member.

3. The connector according to claim 1, wherein:
the improper connection preventing member includes an engagement groove formed along a circumferential direction about the axial line; and
the lock mechanism is configured to fix a plurality of lock balls to the engagement groove after the first engagement portion is engaged with the second engagement portion.

4. A connector to be attached to an opening of a liquid storing container, the connector comprising:
a plug to be attached to an inner peripheral surface of the opening, the opening being formed into a cylindrical shape about an axial line;
an improper connection preventing member to be attached to an outer peripheral surface of the opening, the improper connection preventing member including a first engagement portion disposed at an outside of the outer peripheral surface with respect to the axial line; and
a socket to be detachably attached to the plug, the socket including a second engagement portion to be engaged with the first engagement portion;
wherein the socket includes:
a socket body to be inserted into the plug in a state where the first engagement portion and the second engagement portion are engaged with each other; and
a lock mechanism configured to fix the socket body to the improper connection preventing member in a state where the first engagement portion and the second engagement portion are engaged with each other,
the improper connection preventing member includes an engagement groove formed along a circumferential direction about the axial line,
the lock mechanism is configured to fix a plurality of lock balls to the engagement groove after the first engagement portion is engaged with the second engagement portion, and
the lock mechanism includes:
the plurality of lock balls; and
a first cylindrical member formed into a cylindrical shape about the axial line and including a plurality of opening holes each having a diameter smaller than an outer diameter of the lock ball;
a second cylindrical member formed into a cylindrical shape about the axial line and including a regulating portion disposed at an outer peripheral side of the first cylindrical member, the regulating portion being configured to regulate the lock balls accommodated in the opening holes to be in a state where the lock balls are engaged with the engagement groove; and an urging force generation portion having one end that is formed along the axial line and fixed to the first cylindrical member, and having another end that is formed along the axial line and fixed to the second cylindrical member, the urging force generation portion being configured to urge the second cylindrical member against a position where the regulating portion is in contact with the lock balls.

* * * * *